United States Patent
Yu et al.

(10) Patent No.: US 9,813,935 B2
(45) Date of Patent: Nov. 7, 2017

(54) STATE-DRIVEN SECONDARY CELL ACTIVATION AND DEACTIVATION

(71) Applicant: Telefonaktiebolaget LM Ericsson (Publ), Stockholm (SE)

(72) Inventors: Ping Yu, Ottawa (CA); Christian Skärby, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/208,117

(22) Filed: Jul. 12, 2016

(65) Prior Publication Data

US 2016/0323769 A1    Nov. 3, 2016

Related U.S. Application Data

(63) Continuation of application No. 14/028,661, filed on Sep. 17, 2013, now Pat. No. 9,414,384.

(51) Int. Cl.
*H04W 72/04* (2009.01)
*H04W 28/02* (2009.01)
(Continued)

(52) U.S. Cl.
CPC ....... *H04W 28/0221* (2013.01); *H04L 5/0032* (2013.01); *H04L 5/0098* (2013.01);
(Continued)

(58) Field of Classification Search
CPC ....... H04L 47/12; H04L 49/35; H04L 49/356; H04L 49/506; H04L 49/505; H04L 67/1097; H04W 72/0453; H04W 52/0206
See application file for complete search history.

(56) References Cited

U.S. PATENT DOCUMENTS 6,760,303 B1    7/2004    Brouwer
8,724,550 B2    5/2014    Kone
(Continued)

FOREIGN PATENT DOCUMENTS

EP    2 197 235 A2    7/2009
EP    2 341 730 A1    7/2011
(Continued)

OTHER PUBLICATIONS

3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC); Protocol Specification (Release 11)" Jul. 3, 2013 consisting of 57-pages.
(Continued)

*Primary Examiner* — Ricky Ngo
*Assistant Examiner* — Lan Huong Truong
(74) *Attorney, Agent, or Firm* — Christopher & Weisberg, P.A.

(57) ABSTRACT

A method and system for selectively activating and deactivating secondary cells in a wireless communication system are disclosed. According to one aspect, the invention provides a finite state machine having a plurality of states facilitating secondary cell activation and deactivation decisions. The states of the finite state machine include a deactivated state and an activated state. In the deactivated state, a secondary cell is deactivated and a media access control element, MAC CE, for deactivation is sent to the UE. The base station in the deactivated state is not allocating resources for maintaining transmission on the secondary cell. In the activated state, the secondary cell is active and a MAC CE for activation is sent to the UE. In the activated state, the base station is ready to transmit on the secondary cell.

22 Claims, 8 Drawing Sheets

(51) Int. Cl.
*H04W 52/02* (2009.01)
*H04W 24/02* (2009.01)
*H04L 5/00* (2006.01)
*H04W 76/04* (2009.01)

(52) U.S. Cl.
CPC ....... *H04W 24/02* (2013.01); *H04W 28/0236* (2013.01); *H04W 52/0206* (2013.01); *H04W 72/0453* (2013.01); *H04W 76/048* (2013.01); *Y02B 60/50* (2013.01)

(56) References Cited

U.S. PATENT DOCUMENTS

| | | | | |
|---|---|---|---|---|
| 8,917,664 | B2* | 12/2014 | Jang | H04W 24/10 370/310 |
| 8,930,965 | B1 | 1/2015 | Shalev et al. | |
| 8,942,151 | B2 | 1/2015 | Anderson et al. | |
| 2011/0075624 | A1* | 3/2011 | Papasakellariou | H04L 5/0053 370/329 |
| 2011/0134774 | A1* | 6/2011 | Pelletier | H04W 52/365 370/252 |
| 2011/0222502 | A1 | 9/2011 | Aminaka | |
| 2011/0237202 | A1 | 9/2011 | Uemura et al. | |
| 2012/0057544 | A1 | 3/2012 | Xu et al. | |
| 2012/0106478 | A1 | 5/2012 | Han et al. | |
| 2012/0182879 | A1 | 7/2012 | Tamura et al. | |
| 2012/0230265 | A1* | 9/2012 | Lee | H04L 5/003 370/329 |
| 2012/0281582 | A1 | 11/2012 | Yang et al. | |
| 2012/0327883 | A1 | 12/2012 | Yang et al. | |
| 2013/0010716 | A1 | 1/2013 | Dinan | |
| 2013/0188473 | A1* | 7/2013 | Dinan | H04W 56/0005 370/216 |
| 2014/0056243 | A1* | 2/2014 | Pelletier | H04W 74/04 370/329 |

FOREIGN PATENT DOCUMENTS

| | | |
|---|---|---|
| EP | 2 475 127 A1 | 7/2012 |
| EP | 2 557 867 A1 | 2/2013 |
| EP | 2 590 352 A1 | 5/2013 |
| WO | 2011063244 A2 | 5/2011 |
| WO | 2013050307 A1 | 4/2013 |

OTHER PUBLICATIONS

3GPP TSG RAN WG2 Meeting #67 R2-094258, ShenZhen, PROC, Aug. 24-Aug. 28, 2009, Agenda Item: 7.3 Source: MediaTek, Title: DRX Operation in Carrier Aggregation Mode for LTE-A, Document for: Discussion and Decision consisting of 2-pages.

3GPP TSG-RAN WG2 #66 TDOC R2-092957, San Francisco, USA, May 4-8, 2009, Agenda Item: 7, Source: Ericsson, Title: Impact of Carrier Aggregation on the L2 protocol architecture for LTE Rel-10, Document for: Discussion, Decision consisting of 7-pages.

3GPP TSG-RAN2 #68 meeting R2-096488, Jeju, Korea, Nov. 9-Nov. 13, 2009, Title: CC management issues, Source: Huawei, Agenda Item: 7.31, Document for: Discussion and Decision consisting of 6-pages.

3GPP TSG RAN WG1 Meeting #67 R1-113763, San Francisco, USA, Nov. 14-18, 2011, Source: ZTE, Title: Discussion on CSI feedback for CoMP based on carrier aggregation feedback structure, Agenda Item: 7.5.1.1 Document for: Discussion and Decision consisting of 3-pages.

PCT Invitation to Pay Additional Fees, Form PCT/ISA/206, dated Nov. 27, 2014 for corresponding International Application No. PCT/IB2014/063686; International Filing Date: Aug. 4, 2014 consisting of 7-pages.

International Search Report and Written Opinion, Form PCT/ISA/220, dated Feb. 10, 2015 for corresponding International Application No. PCT/IB214/063686; International Filing Date: Aug. 4, 2014 consisting of 18-pages.

Written Opinion of the International Preliminary Examining Authority dated Aug. 20, 2015 for International Application No. PCT/IB2014/063686, International Filing Date: Aug. 4, 2014 consisting of 9-pages.

International Preliminary Report on Patentability dated Nov. 17, 2015 for International Application No. PCT/IB2014/063686, International Filing Date: Aug. 4, 2014 consisting of 45-pages.

\* cited by examiner

STATE-DRIVEN SECONDARY CELL ACTIVATION AND DEACTIVATION

CROSS-REFERENCE TO RELATED APPLICATIONS

This Application is a continuation of U.S. patent application Ser. No. 14/028,661, filed Sep. 17, 2013, entitled STATE-DRIVEN SECONDARY CELL ACTIVATION AND DEACTIVATION, the entirety of which is incorporated herein by reference.

TECHNICAL FIELD

The present invention relates to wireless communications and more particularly to providing secondary cells in a wireless communication network.

BACKGROUND

Long term evolution (LTE) carrier aggregation allows user equipment (UE) to receive and send data over more than one carrier if additional or secondary carriers are configured and activated for a carrier aggregation capable UE. Adding a secondary carrier to a UE is equivalent to adding a secondary cell. Secondary cells can be dynamically activated or deactivated by an evolved node B (eNB) base station. The secondary cell configuration information is communicated to a UE through radio resource control reconfiguration messages transmitted via the UE's primary cell. Once a secondary cell has been configured, the eNB sends media access control (MAC) control elements (MAC CEs) to the primary cell advising the UE whether the secondary cells are activated or deactivated. When, the downlink secondary cells are activated, the UE monitors the physical control channel (PDCCH) for the secondary cell and provides downlink channel condition reports to the eNB.

Activated secondary cells potentially increase throughput for UE data transmission. However, the UE consumes more battery power while monitoring the PDCCH for the activated secondary cells. Also, activated secondary cells demand greater memory resources and processing power at the eNB. Therefore it is preferable that carrier aggregation is only provided to a UE when there is a benefit, such as increased throughput. Third generation partnership project (3GPP) standards provide communication interfaces between the eNB and the UE but do not define an algorithm for making effective use of carrier aggregation, while taking into consideration battery savings in the UE and processing load and available memory in the eNB.

SUMMARY

Methods and systems for selectively activating and deactivating secondary cells in a wireless communication system are disclosed. According to one aspect, the invention provides a finite state machine having a plurality of states facilitating secondary cell activation and deactivation decisions. The states of the finite state machine include a deactivated state and an activated state. Upon entry into the deactivated state, a secondary cell is deactivated and a media access control element, MAC CE, for deactivation is sent to the UE. The base station in the deactivated state does not allocate resources for maintaining transmission on the secondary cell. Upon entry into the activated state, the secondary cell is activated and a MAC CE for activation is sent to the UE. In the activated state, the base station is ready to transmit on the secondary cell.

According to this aspect, in some embodiments, the states of the finite state machine include an activated-limited state for which the secondary cell is activated and a MAC CE for activation has been sent to the UE. In the activated limited state, the base station is not ready to transmit on the secondary cell because of communication channel conditions. In some embodiments, the states of the finite state machine include an activating state for which the secondary cell is to be activated, but reception of the MAC CE for activation has not been confirmed by the UE. In some embodiments, the states further include a locked state for which the secondary cell is deactivated and a MAC CE for deactivation has been acknowledged by the UE. In some embodiments, the states further include a lock request state for which a locked state is requested by an entity of the base station external to the finite state machine.

According to another aspect, the invention provides a method of selectively activating and deactivating secondary cells at a base station for use by a user equipment. The method includes determining whether a total number of activated secondary cells for all UEs is below a first preemption threshold. The first preemption threshold establishes a minimum number of secondary cells to be activated simultaneously. If the number of activated secondary cells is below the first preemption threshold, at least one deactivated secondary cell is activated.

According to this aspect, in some embodiments, the method includes determining whether a number of activated secondary cells is above a second preemption threshold larger than the first threshold. The second preemption threshold establishes a maximum number of secondary cells to be activated simultaneously. If the number of activated secondary cells is above the second preemption threshold, at least one activated secondary cell is deactivated. In some embodiments, selection of a secondary cell to deactivate is based on a quality of a communication channel between the base station and the UE. In some embodiments, selection of a secondary cell to deactivate is based on an amount of data available in a buffer to be sent to the UE. In some embodiments, selection of a secondary cell to deactivate is based on a preemption weight associated with the secondary cell. In these embodiments, the preemption weight is based on a coverage time of a secondary cell. Coverage time is how long a UE reports secondary cell quality as poor or good. The longer the coverage time of the secondary cell, the higher the preemption weight associated with the secondary cell. The preemption weight may be based on a size of a downlink buffer load size associated with the secondary cell. The smaller the downlink buffer load size associated with the secondary cell, the higher the preemption weight associated with the secondary cell. A plurality of preemption weights may be ranked according to size and secondary cells may be deactivated in an order of rank of their preemption weights.

According to another aspect, the invention provides a method for selectively activating and deactivating secondary cells at a base station for use by a user equipment. The method includes implementing a plurality of states in a finite state machine. The finite states include a secondary cell deactivated state and a secondary cell activating state. A transition between states is governed by a first timer, such that when in the secondary cell deactivated state, transition to the secondary cell activating state occurs when the first timer has not expired and when a total data buffer load exceeds a first threshold.

According to this aspect, in some embodiments, the implementing includes, when in the secondary cell activating state, transitioning to the secondary cell deactivated state, the transitioning occurring when the timer has not expired and when a total data buffer load is less than the first threshold. In some embodiments, the finite states include a secondary cell activating limited state and a second carrier activated state, and the implementing further includes when in the secondary cell activating limited state, transitioning to the secondary cell activated state, the transitioning occurring when a measure of a communication channel condition exceeds a second threshold. In some embodiments, the finite states include a secondary activated state and the implementing further includes, when in the secondary cell activated state, transitioning to the secondary cell deactivated state, the transitioning occurring when a deactivation quota does not exceed a third threshold and a second timer has expired.

According to yet another aspect, the invention provides a finite state machine configured to selectively activate and deactivate secondary cells at a base station for use by a user equipment. The finite state machine includes a memory and a processor. The memory is configured to store a set of values including at least one timer value and at least one threshold. The processor is configured to evaluate the set of values and a set of conditions to determine a state of the finite state machine. The conditions include at least one of whether a timer has exceeded one of the at least one timer value and whether a communication channel condition indication exceeds a first one of the at least one threshold. The processor is further configured to selectively activate a secondary cell and send a media access control element indicating activation to the UE when the finite state machine is in the first state. The processor is further configured to selectively deactivate the secondary cell and send a media access control element indicating deactivation to the UE when the finite state machine is in the second state.

According to this aspect, in some embodiments, the conditions include whether a deactivation quota exceeds a second one of the at least one threshold. In some embodiments the condition of the set of conditions is a data buffer load being one of below and above a threshold. In some embodiments, a condition of the set of conditions is a number of UEs currently being serviced by the base station. In some embodiments, a condition of the set of conditions is a synchronization state of a UE.

DETAILED DESCRIPTION

Figure 1:
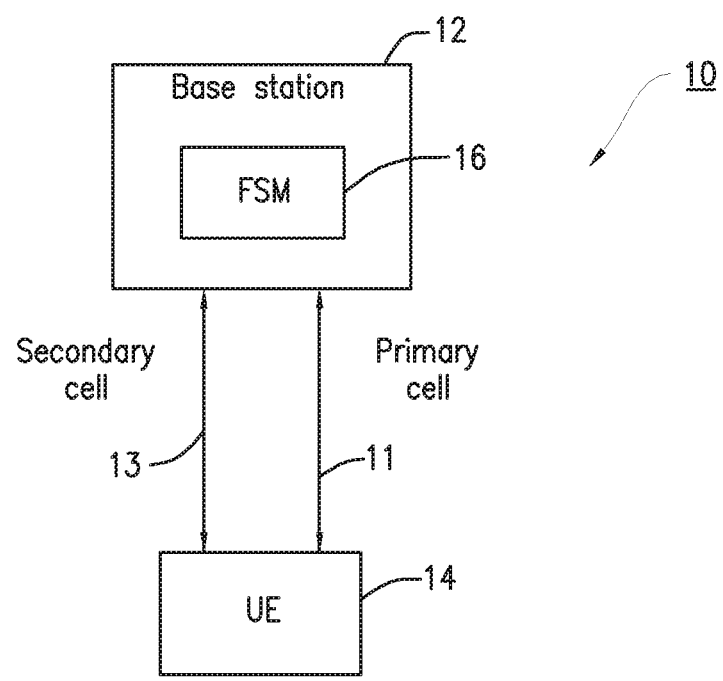
FIG. 1 is a block diagram of a wireless communication system including a base station having a finite state machine and a user equipment, constructed in accordance with principles of the present invention.

Before describing in detail exemplary embodiments that are in accordance with the present invention, it is noted that the embodiments reside primarily in combinations of apparatus components and processing steps related to allocation and use of secondary cells for carrier aggregation in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein illustrate a method and system for managing secondary cells. Management, such as the decision to activate or deactivate the secondary cell may depend without limitation, on such factors as a downlink data buffer size, channel quality for a secondary cell, timing of activation or deactivation, and efficient allocation of base station resources.

Referring now to the drawing figures, in which like reference designators denote like elements, there is shown in FIG. 1 an exemplary wireless communication system 10 having a base station 12 and a user equipment (UE) 14. The base station 12 may be in communication with one or more UEs 14 via one or more primary cells 11 and one or more activate-able secondary cells 13. Although only one base station and one UE are shown, a typical wireless communication system 10 may include many base stations and many UEs.

Figure 2:
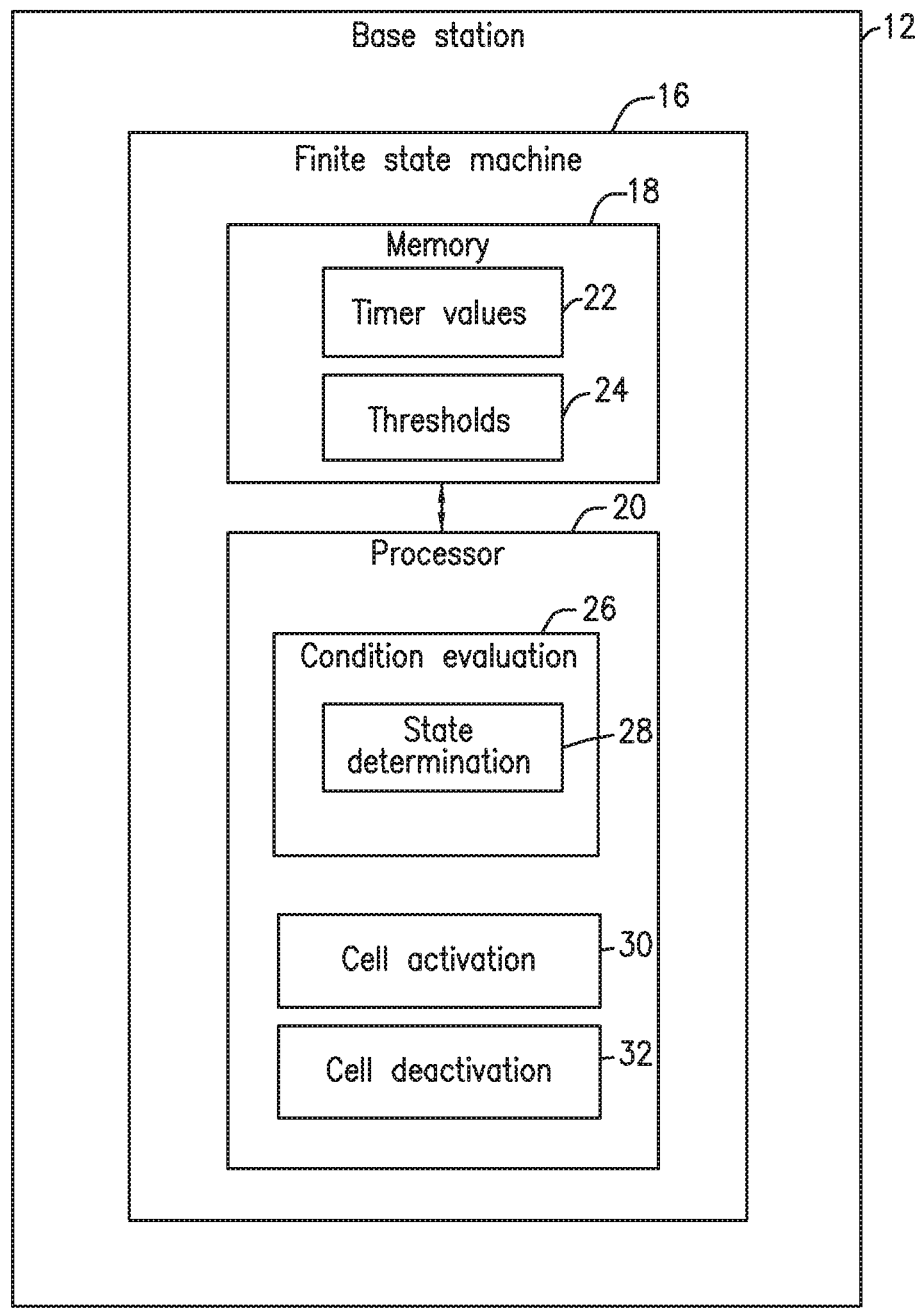
FIG. 2 is a more detailed view of the base station and finite state machine of FIG. 1.

FIG. 2 is a more detailed block diagram of the base station 12 and finite state machine 16. The finite state machine 16 includes a memory 18 and a processor 20. The memory 18 stores timer values 22, such as the prohibit timer and the coverage timer. The memory 18 also stores the activation and deactivation thresholds in the channel quality threshold. The processor 20 performs the finite state machine functions described above.

Accordingly, the processor 20 performs a condition evaluation function 26 to determine a state 28 of the finite state machine 16. Based on the state 28 of the finite state machine 16, the processor 20 may perform a function of cell activation 30 or cell deactivation 32. The conditions 26 and the states 28 of the finite state machine 16 are as described below with reference to FIGS. 3 through 9.

In operation, the processor 20 evaluates a set of values and a set of conditions to determine a state of the finite state machine 16 and determines whether to transition from a first state to a second state based on the evaluation. The conditions upon which the determination is based include at least one of whether a timer has exceeded one of at least one timer value to avoid the ping pong effect, and whether a communication channel condition indication exceeds a first one of at least one channel quality threshold to ensure that channel conditions are of sufficient quality to support secondary cell activation.

The states of the finite state machine 26 of the base station 12 may be determined by an algorithm executed by the processor 20. The states may depend upon a downlink data buffer size and/or a quality of the channel between the base station and the UE. The state of the finite machine may determine whether secondary cells are activated or deactivated. This may depend upon whether a pre-determined number of UEs are being serviced by the base station. For example, if the assignment of secondary cells would preclude service to some of the pre-determined number of UEs, then secondary cells would be deactivated, to ensure that enough primary cells are available to service the pre-determined number of UEs. Assignment of a secondary cell may depend upon channel conditions so that if channel conditions are poor, the processor 20 may not assign a secondary cell for that channel. Also, if the amount of data in a buffer that holds data to be transmitted to a UE is large, then a secondary cell may be assigned to increase throughput to that UE. Further, assignment of a secondary cell to a UE may depend upon whether a cell status is "locked" or "unlocked" and whether the UE is in synchronization with the base station or not. A cell may be locked, for example, for maintenance. A UE being in synchronization with the base station may mean that the UE has synchronized its receiver to a frame structure received from the base station or that the base station has adjusted base station transmission timing to avoid collisions between transmission of sub frames.

Thus, the determination of when to activate or deactivate secondary cells is made at the base station 12 according to the finite state machine 16 which includes the following states:

Secondary cell (Scell) deactivated: in this state, the secondary cell is deactivated and a media access control control element (MAC CE) related to the deactivated state is sent to the UE on the primary cell.

Scell activated: in this state, the secondary cell is activated and a MAC CE related to this state has been received by the UE and the UE is ready for data transmission;

Scell activated limited: in this state, the secondary cell is activated and the MAC CE related to this state has been received by the UE. However the UE is not fully ready for data transmission because channel conditions are either unknown or poor;

Scell activating: in this state, the secondary cell is to be activated and the reception of a MAC CE related to this state has not been confirmed by the UE;

Scell locked: in this state, the secondary cell is deactivated because the cell is locked and a MAC CE related to this state for cell deactivation has been sent to the UE; and Scell lock request: in this state, a cell lock request has been received from an external source, such as, for example, an operator, seeking to lock the cell for maintenance.

The transitions between states are partially governed by timers and thresholds. A first timer, called a prohibit timer, is used to prevent secondary cell activation or deactivation MAC CEs from being sent too quickly, one following another, to prevent a ping pong effect. Every time a secondary cell activation or deactivation status changes, and an MAC CE is prepared, the prohibit timer is started. While the prohibit timer is active, no change in activation or deactivation is made.

A second timer is called a secondary cell coverage timer. If the UE's channel quality indicator (CQI) report indicates a secondary cell's channel condition is better than a channel quality threshold, the secondary cell coverage timer is restarted. If this timer expires, the expiration indicates that the secondary cell channel condition is not good enough for carrier aggregation so that secondary cell deactivation should be considered. Thus, when channel conditions are poor, the base station may not assign a secondary cell for that channel.

The transitions between states are also partially governed by a secondary cell deactivation threshold and a secondary cell activation threshold. A simplified exemplary process for activating and deactivating secondary cells is described with reference to FIG. 3. If a number of activated secondary cells is below a first preemption threshold, referred to herein as an activation threshold, (block S92), then at least one deactivated secondary cell is activated (block S94). If a number of activated secondary cells exceeds a second preemption threshold greater, referred to herein as a deactivation threshold, that is greater than the first preemption threshold, (block S96), then at least one activated secondary cell is deactivated (block S98). A more detailed explanation of when to activate and deactivate secondary cells according to states of the finite state machine 16 is provided with reference to FIGS. 4-9.

As explained above, activated secondary cells consume memory resources of the base station. Once memory usage of the base station is close to a maximum limit, maintaining a predetermined number of connected UEs may take a higher priority than utilizing secondary cells. Secondary cell preemption is used to relinquish secondary cell deactivation privileges for new UE connections when resource usage approaches the limit. To enforce this preemption policy, embodiments employ the secondary cell deactivation threshold and the secondary cell activation threshold. If resources used for connecting UE's and activated secondary cells are below a secondary cell activation threshold, then an activation quota is determined as a number of secondary cells that can be transited from the activated to activated state. When this occurs, a deactivation quota is set to 0. If resources used for connecting UE's and activated secondary cells exceeds the deactivation threshold, the deactivation quota is determined as a number of secondary cells that are to be deactivated to give room for new UE connections.

When there are more activated secondary cells than the deactivation quota will allow, a methodology may be employed to determine which activated secondary cells are to be preempted. This determination may be based on channel conditions or an amount of data required to be sent to the UE on the secondary cell. Accordingly, if the deactivation quota is greater than 0, preemption weights are calculated based on a secondary cell's coverage time and downlink data buffer load. Coverage time refers to how long the UE reports that secondary cell quality is good or poor. The longer the secondary cell's coverage time and the smaller the downlink data buffer load, the higher the preemption weight. The secondary cells may be ranked based on their preemption weights and deactivated in order of rank up to the amount of the deactivation quota.

Figure 3:
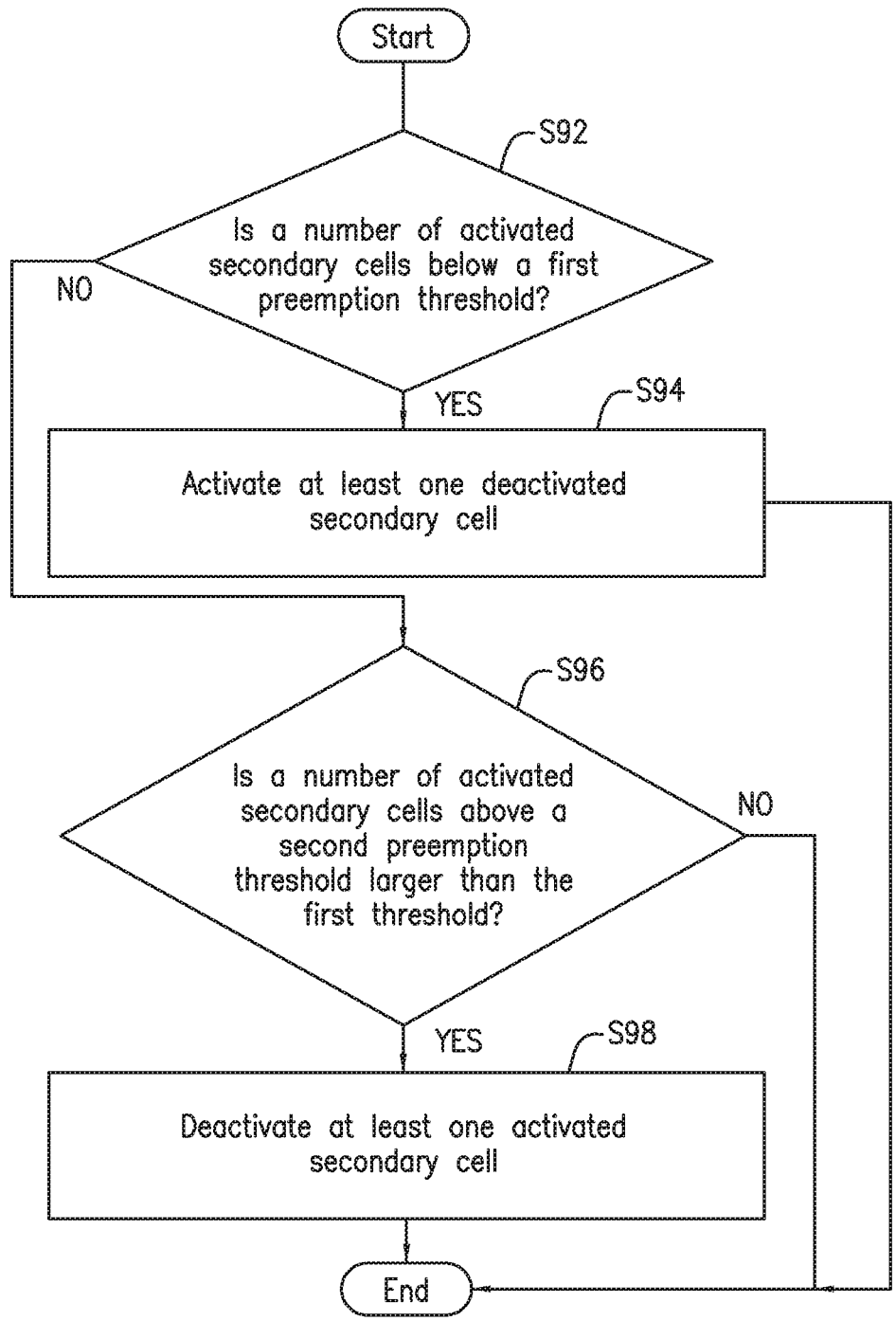
FIG. 3 is a flowchart of an exemplary process for activating and deactivating secondary cells.

Ideally, to conserve resources, a secondary cell should be activated only when needed, such as when there is a lot of data to be sent and channel conditions for a secondary cell are good. Accordingly, a downlink data buffer load may be compared to an activation threshold to determine whether the secondary cell should be activated. Similarly, a downlink data buffer load may be compared to a deactivation threshold to determine whether a secondary cell should be deactivated. Using different activation and deactivation thresholds, as shown in FIG. 3, a ping-pong effect of repeatedly activating and deactivating a same secondary cell may be avoided.

In an alternative embodiment, a value for threshold comparison may be chosen according to:

dlDataUnit=(current total buffered DL data at eNB)/
(total bandwidths of pcell and scells)

where pcell refers to a primary cell and scell refers to a secondary cell. The primary cell is associated with a primary carrier and the secondary cell is associated with a secondary carrier. If dlDataUnit is larger than the first threshold and there are deactivated secondary cells for a particular UE, one or more secondary cells may be activated. If, on the other hand, dlDataUnit is smaller than the second threshold and there are activated secondary cells for the UE, one or more activated secondary cells may be deactivated. Thus, secondary cell activation may depend upon an amount of data in a buffer available to be transmitted to a UE. Once again, using different first and second thresholds, a ping-pong effect of repeatedly activating and deactivating a same secondary cell may be avoided.

In yet another embodiment, a threshold may be defined according to how many subframes are needed to transmit downlink data in a buffer if at least some of the bandwidth of the primary and secondary cells are assigned to the transmission. The size of the transport block for each subframe may be estimated based on bandwidth, code words and channel conditions of available cells. The number of subframes is computed as the current total buffered downlink data amount divided by the transport block size. If the number of subframes are more than a first threshold and there are deactivated secondary cells for the UE, one or more deactivated secondary cells may be activated. If the number of subframes are fewer than a second threshold and there are activated secondary cells for the UE, one or more activated secondary cells may be deactivated. Once again, using different first and second thresholds, a ping-pong effect of repeatedly activating and deactivating a same secondary cell may be avoided.

Figure 4:
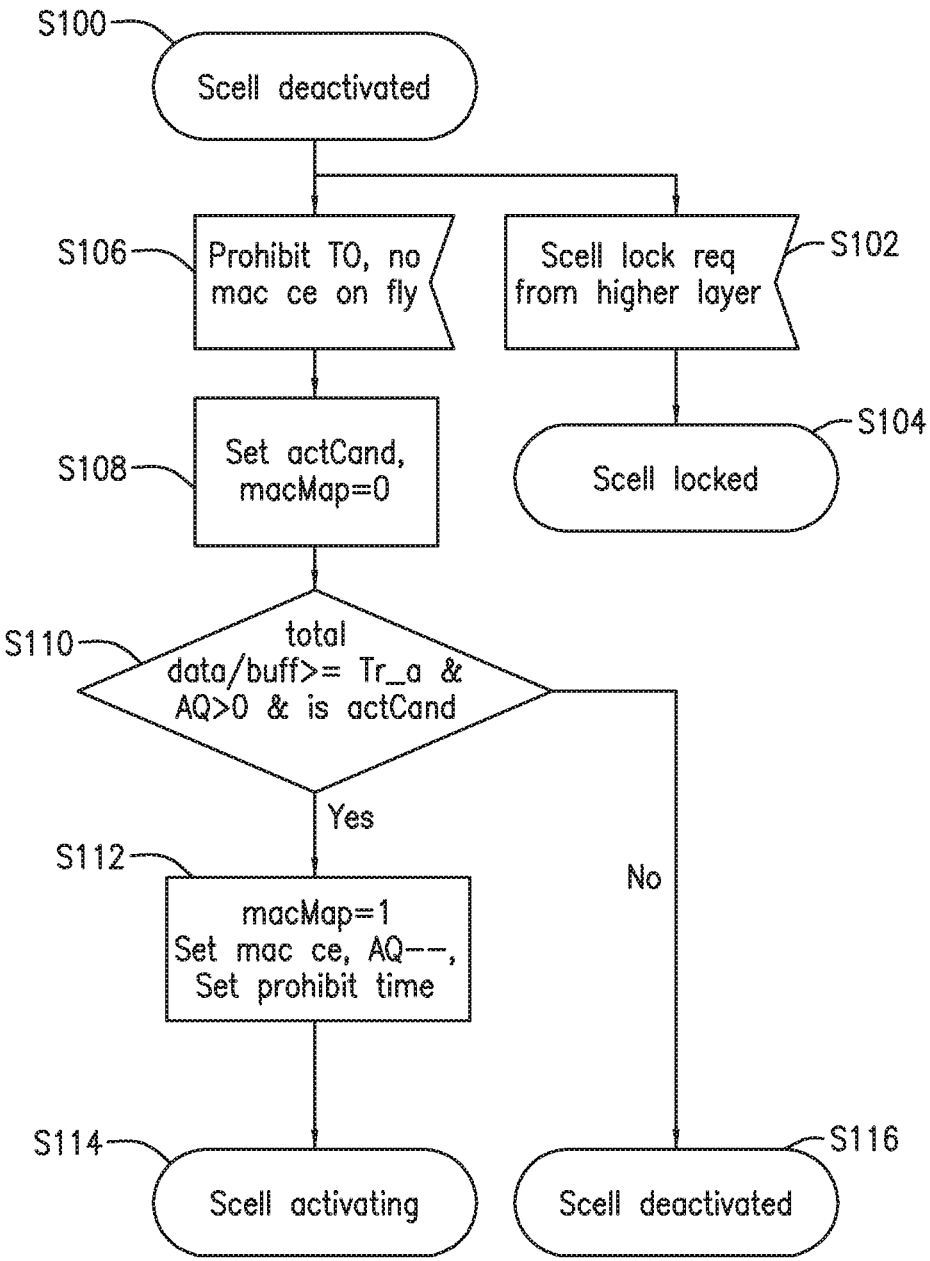
FIG. 4 is a flowchart of an exemplary process for transitioning from a secondary cell deactivated state of the finite state machine of FIG. 1.

A more detailed account of secondary cell activation and deactivation and transitions from the various states described above will now be given with reference to FIGS. 4-9. Referring to FIG. 4, there is shown an exemplary process for controlling transition from the Scell deactivated state (block S100). In the Scell deactivated state, the secondary cell is deactivated and a MAC CE related to this state is sent to the UE on the primary cell. If the secondary cell is to be locked (block S102), the state is changed to Scell locked (block S104). In the Scell locked state, the secondary cell is deactivated and a MAC CE related to this state has been received by the UE. Otherwise, a determination whether to transition to another state is made only if the prohibit timer is not running (prohibit TO), there is no MAC CE in transit (no MAC CE on fly), and the UE is discontinuous reception (DRX) active and synchronized to the base station (block S106). DRX refers to a battery power conservation function where a US is allowed to power off its receiver according to a network configured pattern.

If there are more than one configured and deactivated secondary cells for this UE, then a predetermined number of secondary cells are selected as activation candidates (set actCand), and the MAC CE bit for this secondary cell is initialized to 0 (macMap=0) (block S108). Note that each different bit in the MAC CE may refer to a different secondary cell. The value of the bit indicates if the secondary cell is to be activated or deactivated. Next, a determination is made whether a buffer load of data to be transmitted to the UE is higher than a first threshold (totalDataBuff=Tr_a) determined by, for example, one of the three methods described above (block S110). If the buffer load of data to be transmitted to the UE is higher than the first threshold, the deactivation quota is greater than 0 (AQ>0), and the secondary cell is an activation candidate (actCand), then the secondary cell is activated. Thus, activation is predicated on an amount of data in a buffer, and on the deactivation quota discussed above with reference to FIG. 3. If an amount of data in the buffer is high, a secondary cell for the UE may be assigned or not deactivated.

Once all secondary cells for this UE have been processed, the MAC CE bit for this secondary cell 1 is set equal to 1 (macMap=1), the deactivation quota is reduced by one (AQ−), and the prohibit timer is started (set prohibit time) for this UE (block S112). Then, the finite state machine transitions to the state Scell activating (block S114). In the Scell activating state, the secondary cell is to be activated but the reception of the MAC CE related to this state has not been confirmed by the UE. If the buffer load of data be to transmitted to the UE is lower than the first threshold, the deactivation quota is 0 or the secondary cell is not an activation candidate, then the state remains in a condition of Scell deactivated (block S116). In the Scell deactivated state, the secondary cell is deactivated and the MAC CE related to the deactivated state is sent to the UE on the primary cell. Thus, the deactivation is predicated on an amount of data in a buffer, and on the deactivation quota. If the amount of data in the buffer is low, a secondary cell may be deactivated or not assigned.

Figure 5:
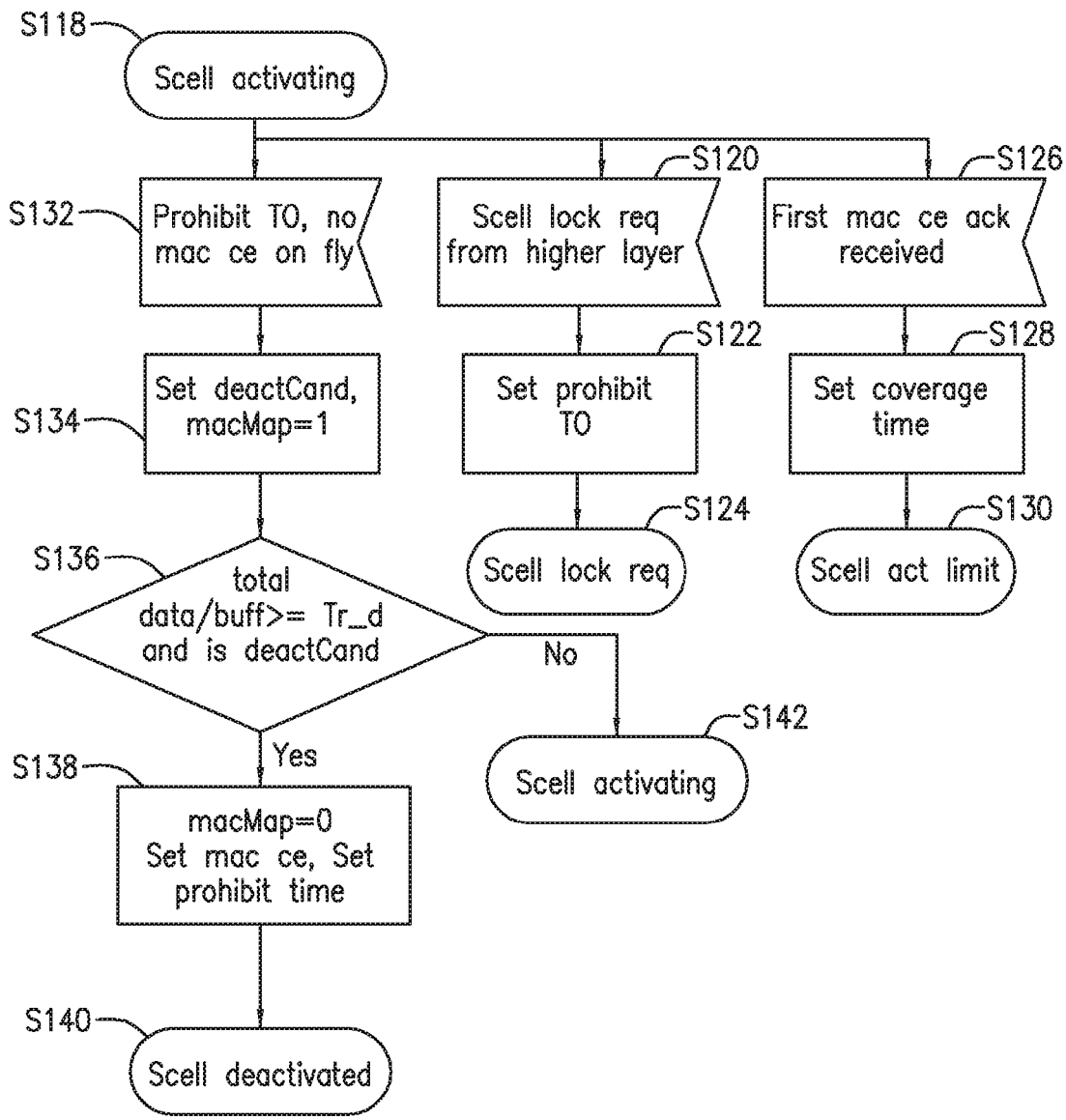
FIG. 5 is a flowchart of an exemplary process for transitioning from a secondary cell activating state of the finite state machine of FIG. 1.

Referring to FIG. 5, there is shown an exemplary process for controlling transition from the Scell activating state (block S118). If the secondary cell is to be locked (block S120), then the prohibit timer is stopped (block S122) and the state transitions to Scell lock request (block S124). If, on the other hand, a UE signal acknowledges a MAC CE which contains this Scell activation (block S126), the coverage timer is restarted to avoid the secondary cell being deactivated too soon (block S128), and the state transitions to Scell activated limited (block S130). In the Scell activated limited state, the secondary cell is activated and the MAC CE related to this state has been received by the UE. However, the UE is not fully ready for data transmission on the activated secondary cell because channel conditions are either unknown or poor. Thus, activation is predicated on channel quality. If channel conditions are poor e.g., below a predetermined quality threshold that may be based on signal to interference plus noise ratio, a secondary cell may be deactivated or not assigned. If channel conditions are good, at or above a predetermined quality threshold that may be based on signal to interference plus noise ratio the secondary cell may be assigned or not deactivated.

Otherwise, a determination is made whether to change state based on whether the prohibit timer is not running, there is no MAC CE in transit, the UE is DRX active and is synchronized to the base station (block S132). This case could occur if the MAC CE has not been scheduled since the last decision due to heavy UE loading and DRX service and/or UE time alignments are close to expiration. If the determination is made to change state based on these conditions, the MAC CE bit for this secondary cell is initialized to one (macMap=1) and the secondary cell is set to be a deactivation candidate (Set deactCand) (block S134).

When the buffer load is lower than the second threshold (block S136), then this secondary cell is to be activated. Once all secondary cells for this UE have been processed, the MAC CE bit is set to 0, the MAC CE is set for transmission (set mac ce), the prohibit timer for this UE is set (set prohibit time) (block S138), and the finite state machine 16 transitions to the Scell deactivated state. When the buffer load is greater than the threshold, then the state remains Scell activating (block S142). In the Scell activating state, the secondary cell is to be activated but the reception of the MAC CE related to this state has not been confirmed by the UE.

Figure 6:
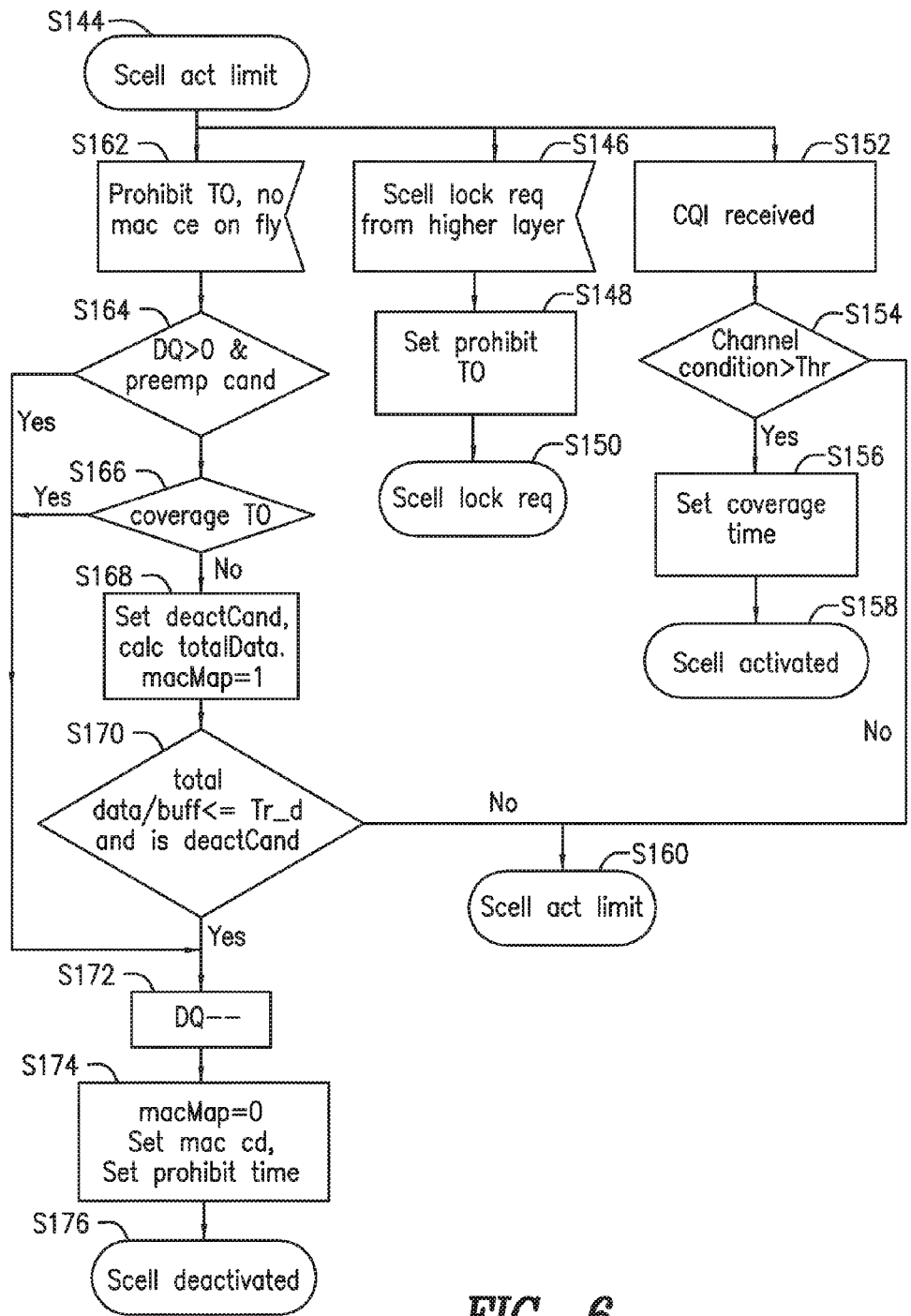
FIG. 6 is a flowchart of an exemplary process for transitioning from a secondary cell activated limited state of the finite state machine of FIG. 1.

Referring to FIG. 6, there is shown an exemplary process for controlling transition from the Scell activated limited state (block S144). If the secondary cell is to be locked (block S146), then the prohibit timer is stopped (block S148) and the state transitions to Scell lock request (block S150). If, on the other hand, a UE's channel quality indicator for this secondary cell is received (block S152) and the reported channel condition is greater than a channel quality threshold (block S154), then the coverage timer is set (block S156) and the state is changed to Scell activated (block S158). In the Scell activated state, the secondary cell is activated and the MAC CE related to this state has been received by the UE and the UE is ready to receive on the secondary cell. If the reported channel condition is not greater than the channel quality threshold the finite state machine remains in the Scell activated limited state (block S160).

Otherwise, a determination whether to transition to another state is made only if the prohibit timer is not running, there is no MAC CE in transit, the UE is DRX active and synchronized to the base station (block S162). If the deactivation quota is greater than 0 and this secondary cell is a preemption candidate (block S164), then this secondary cell is to be deactivated. Otherwise, if the coverage timer expires (block S166), then this secondary cell is to be deactivated because the channel condition has been poor. In block S168, a secondary cell among the activated secondary cells is selected as a deactivation candidate. Also, the total downlink data is summed, and the MAC CE bit for the candidate secondary cell is set to 1.

If a buffer load is lower than a first threshold (block S170), then this secondary cell is deactivated. Otherwise the state remains in Scell activated limited state (block S160). If the buffer load is not lower than the first threshold, then the deactivation quota is reduced by one (DQ−) (block 172). Once all secondary cells for this UE have been processed, the MAC CE bit for this secondary cell is set to 0, the MAC CE is set for transmission, and the prohibit timer is started for this UE (block S174). The state then transitions to Scell deactivated (block S176).

Figure 7:
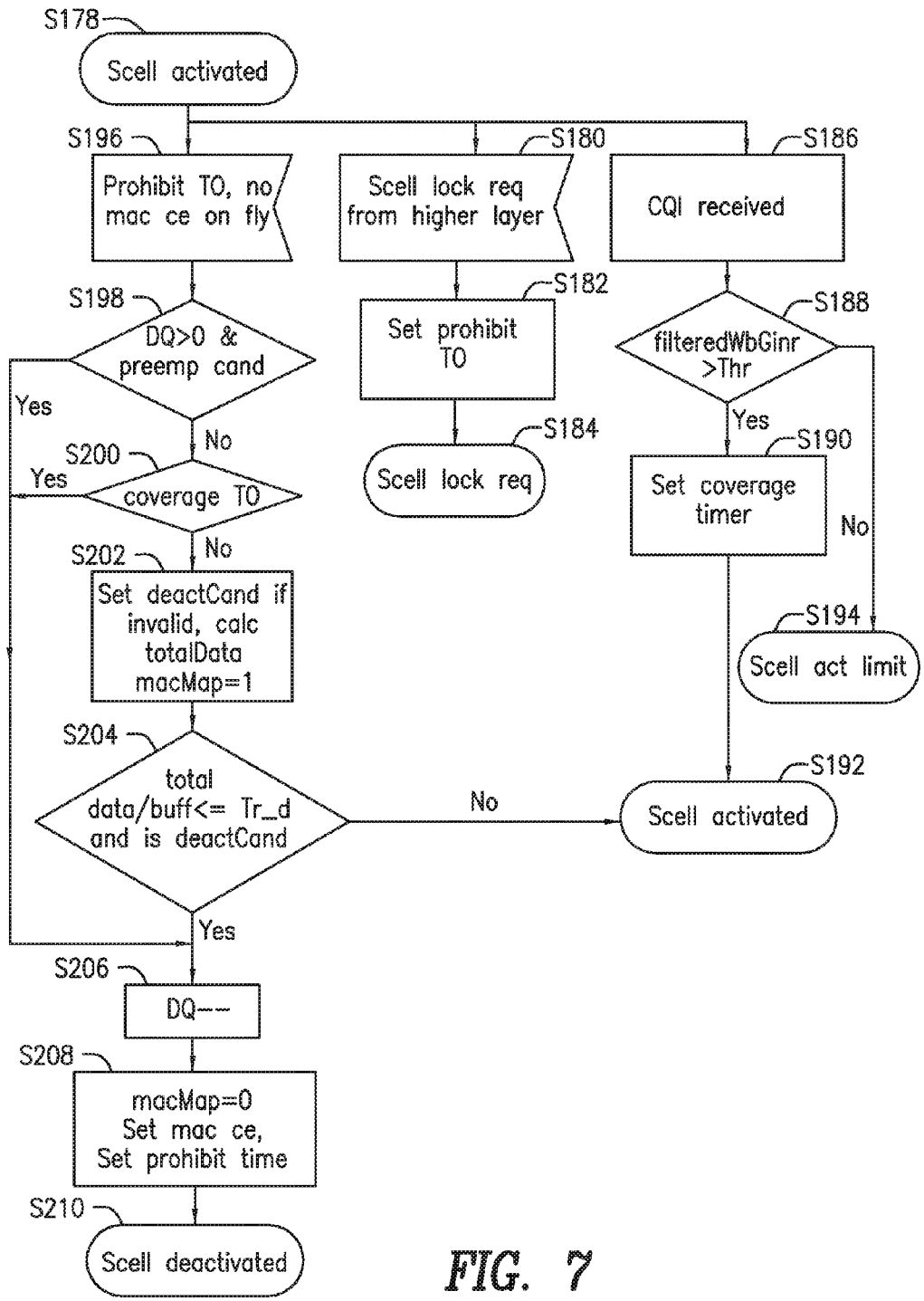
FIG. 7 is a flowchart of an exemplary process for transitioning from a secondary cell activated state of the finite state machine of FIG. 1.

Referring to FIG. 7, there is shown an exemplary process for controlling transition from the Scell activated state (block S178). If the secondary cell is to be locked (block S180), then the prohibit timer is stopped (block S182) and the state transitions to Scell lock request (block S184). If, on the other hand, a UE's channel quality indicator for this secondary cell is received (block S186) and the reported channel condition is greater than a channel quality threshold (block S188), then the coverage timer is set (block S190) and the state is changed to Scell activated (block S192). Thus, continued activation is predicated on channel quality indicated by the variable "filteredWBGinr". If the reported channel condition is not greater than the channel quality threshold, the finite state machine transitions to the Scell activated limited state (block S194), indicating that the UE is ready to receive on the secondary cell once channel conditions improve.

Otherwise, a determination whether to transition to another state is made only if the prohibit timer is not running, there is no MAC CE in transit, the UE is DRX active and synchronized to the base station (block S196). If the deactivation quota is greater than 0 and this secondary cell is a preemption candidate (block S198), then this secondary cell is to be deactivated. If the coverage timer has expired (block S200) then this secondary cell is to be deactivated because the channel condition has been poor.

Otherwise, the secondary cell is set as a deactivation candidate only when there are no other candidates available for this UE such that one or a set of secondary cells are to be deactivated due to a small buffer data size (block S202). If the buffer load is lower than a first threshold, then this secondary cell (block S204) is deactivated; otherwise the state remains Scell activated (block S192). If the buffer load is greater than the first threshold, then the deactivation quota is reduced by one (block S206). Once all secondary cells for this UE have been processed, the MAC CE bit for this secondary cell is set to 0, the MAC CE is set for transmission, and the prohibit timer is started for this UE (block S208). The finite state machine then transitions to the Scell deactivated state (block S210).

Figure 8:
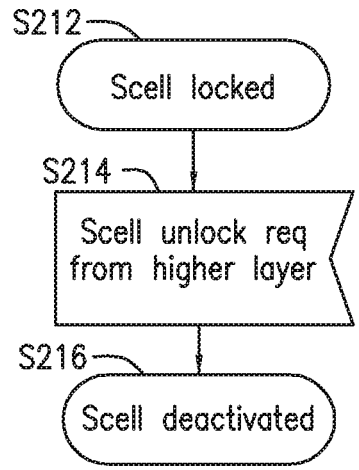
FIG. 8 is a flowchart of an exemplary process for transitioning from a secondary cell locked state of the finite state machine of FIG. 1.
Figure 9:
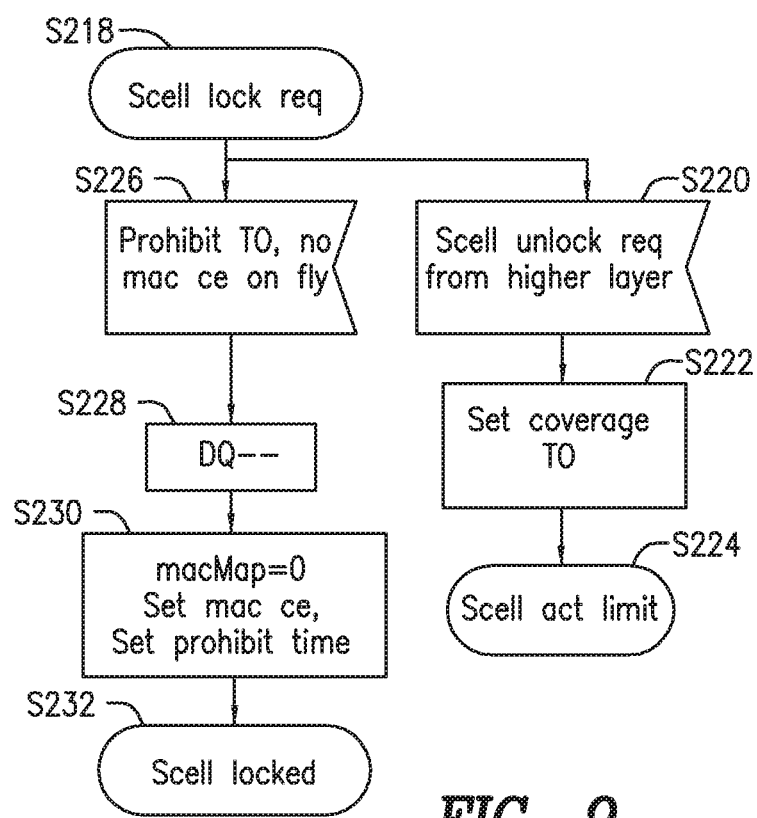
FIG. 9 is a flowchart of an exemplary process for transitioning from a secondary cell lock request state of the finite state machine of FIG. 1.

Referring to FIG. 8, there is shown an exemplary process for controlling transition from the Scell locked state (block S212). If the secondary cell is to be unlocked (block S214), then the state is changed to Scell deactivated (block 216). Referring to FIG. 9, there is shown an exemplary process for controlling transition from the Scell lock request state (block S218). If the secondary cell is to be unlocked, the secondary cell's coverage timer is stopped (block S222) and the state transitions to cell activated limited (block S224).

Otherwise, a determination whether to transition to another state is made only if the prohibit timer is not running, there is no MAC CE in transit, the UE is DRX active and synchronized to the base station (block S226). The secondary cell is to be deactivated and the deactivation quota is reduced by one (block S228). Once all cells for this UE have been processed, the MAC CE bit for this secondary cell is set to 0, the MAC CE is set for transmission, and the prohibit timer for this UE is started (block S230). The state for this UE than transitions to the Scell locked state (block S232).

Thus, embodiments provide state-driven secondary cell activation and deactivation to conserve resources of the base station and the UE. Secondary cells are assigned to UEs based on an amount of data in a buffer destined for the UE, channel quality of the downlink channel to the UE, and current need for cells to be assigned to new UEs. In summary, the finite state machine 16 has a plurality of states facilitating secondary cell activation and deactivation based on buffer size, secondary cell quota and channel quality. The states include a deactivated state for which a secondary cell is deactivated and a media access control element, MAC CE, indicating deactivation is sent to the UE on the primary cell. When in the deactivated state, the base station allocates no resources for transmission on the secondary cell. The states also include an activated state for which the secondary cell is active and a MAC CE indicating activation is sent to the UE. In the activated state, the base station transmits, and the UE receives, on the secondary cell.

Secondary cell activation and deactivation according to the algorithms described herein provide for carrier aggregation to UEs based on channel conditions and amounts of data available to be transmitted for each UE. For example, if channel conditions are poor, assignment of a secondary cell may be ineffective, and thus a secondary cell may not be assigned. As another example, the data available to be transmitted to one UE may be large compared to the data available to be transmitted to another UE, and thus a secondary cell may be assigned to the former UE but not the latter. By not activating a secondary cell for a UE, the UE can conserve power by not having to monitor the physical data control channel PDCCH for the presence of the secondary cell.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of selectively activating and deactivating secondary cells at a base station for use by a user equipment, UE, the method comprising:
   determining whether an amount of data to be transmitted to the UE is greater than a first threshold;
     responsive to determining that the amount of data to be transmitted to the UE is greater than the first threshold, determining whether a number of activated secondary cells is below a first activation threshold, the first activation threshold establishing a maximum number of secondary cells to be activated simultaneously;
     if the number of activated secondary cells is below the first activation threshold, activating at least one deactivated secondary cell;
     if the number of activated secondary cells is equal to or greater than the first activation threshold, refraining from activating at least one deactivated secondary cell;
   determining whether the amount of data to be transmitted to the UE is below a second threshold;
     responsive to determining that the amount of data to be transmitted to the UE is below the second threshold, determining whether the number of activated secondary cells is greater than a second activation threshold, the second activation threshold establishing a minimum number of secondary cells to be activated simultaneously;
     if the number of activated secondary cells is greater than the second activation threshold, deactivating at least one activated secondary cell; and
     if the number of activated secondary cells is equal to or below the second activation threshold, refraining from deactivating at least one activated secondary cell.

2. The method of claim 1, wherein activating at least one deactivated secondary cell comprises selecting at least one deactivated secondary cell to activate and activating the at least one selected deactivated secondary cell.

3. The method of claim 2, wherein selecting at least one deactivated secondary cell to activate is based at least in part on a channel quality of each of the deactivated secondary cells.

4. The method of claim 2, wherein selecting at least one deactivated secondary cell to activate is based at least in part on a rank assigned to each of the deactivated secondary cells.

5. The method of claim 4, wherein for each of the deactivated secondary cells, the rank is based at least in part on a channel quality and a coverage time of the deactivated secondary cell.

6. The method of claim 2, wherein activating the at least one selected deactivated secondary cell further comprises transmitting a secondary cell activation message to the UE.

7. The method of claim 1, wherein deactivating at least one activated secondary cell comprises selecting at least one activated secondary cell to deactivate and deactivating the at least one selected activated secondary cell.

8. The method of claim 7, wherein selecting at least one activated secondary cell to deactivate is based at least in part on a channel quality of each of the activated secondary cells.

9. The method of claim 7, wherein selecting at least one activated secondary cell to deactivate is based at least in part on a rank assigned to each of the activated secondary cells.

10. The method of claim 9, wherein for each of the activated secondary cells, the rank is based at least in part on a channel quality and a coverage time of the activated secondary cell.

11. The method of claim 7, wherein deactivating the at least one selected activated secondary cell further comprises transmitting a secondary cell deactivation message to the UE.

12. A base station configured for operation in a wireless communications network for selectively activating and deactivating secondary cells for use by a user equipment, UE, the base station comprising:
   at least one processor; and
   memory storing instructions executable by the at least one processor, the at least one processor configured to execute the instructions to:
     determine whether an amount of data to be transmitted to the UE is greater than a first threshold;
       responsive to determining that the amount of data to be transmitted to the UE is greater than the first threshold, determine whether a number of activated secondary cells is below a first activation threshold, the first activation threshold establishing a maximum number of secondary cells to be activated simultaneously;

if the number of activated secondary cells is below the first activation threshold, activate at least one deactivated secondary cell; and if the number of activated secondary cells is equal to or greater than the first activation threshold, refrain from activating at least one deactivated secondary cell; and determine whether the amount of data to be transmitted to the UE is below a second threshold;

responsive to determining that the amount of data to be transmitted to the UE is below the second threshold, determine whether the number of activated secondary cells is greater than a second activation threshold, the second activation threshold establishing a minimum number of secondary cells to be activated simultaneously;

if the number of activated secondary cells is greater than the second activation threshold, deactivate at least one activated secondary cell; and if the number of activated secondary cells is equal to or below the second activation threshold, refrain from deactivating at least one activated secondary cell.

13. The base station of claim 12, wherein when activating at least one deactivated secondary cell, the base station is further operable to select at least one deactivated secondary cell to activate and activate the at least one selected deactivated secondary cell.

14. The base station of claim 13, wherein selecting at least one deactivated secondary cell to activate is based at least in part on a channel quality of each of the deactivated secondary cells.

15. The base station of claim 13, wherein selecting at least one deactivated secondary cell to activate is based at least in part on a rank assigned to each of the deactivated secondary cells.

16. The base station of claim 15, wherein for each of the deactivated secondary cells, the rank is based at least in part on a channel quality and a coverage time of the deactivated secondary cell.

17. The base station of claim 13, wherein when activating the at least one selected deactivated secondary cell, the base station is further operable to transmit a secondary cell activation message to the UE.

18. The base station of claim 12, wherein when deactivating at least one activated secondary cell, the base station is further operable to select at least one activated secondary cell to deactivate and deactivate the at least one selected activated secondary cell.

19. The base station of claim 18, wherein selecting at least one activated secondary cell to deactivate is based at least in part on a channel quality of each of the activated secondary cells.

20. The base station of claim 18, wherein selecting at least one activated secondary cell to deactivate is based at least in part on a rank assigned to each of the activated secondary cells.

21. The base station of claim 20, wherein for each of the activated secondary cells, the rank is based at least in part on a channel quality and a coverage time of the activated secondary cell.

22. The base station of claim 18, wherein when deactivating the at least one selected activated secondary cell, the base station is further operable to transmit a secondary cell deactivation message to the UE.

* * * * *